United States Patent [19]
Savidge et al.

[11] 3,883,394
[45] May 13, 1975

[54] WATER-INSOLUBLE PENICILLIN ACYLASE

[75] Inventors: Thomas A. Savidge, Steyning; Lawson William Powell; Kenneth Brian Warren, both of Worthing, all of England

[73] Assignee: Beecham Group Limited, England

[22] Filed: July 12, 1973

[21] Appl. No.: 378,697

[30] Foreign Application Priority Data
July 22, 1972 United Kingdom............... 34411/72

[52] U.S. Cl.................... 195/63; 195/36 P; 195/68; 195/DIG. 11
[51] Int. Cl............................................... C07g 7/02
[58] Field of Search........ 195/63, 68, DIG. 11, 36 P

[56] References Cited
UNITED STATES PATENTS

| | | | |
|---|---|---|---|
| 3,622,462 | 11/1971 | Delin et al. ............... | 195/DIG. 11 X |
| 3,736,231 | 5/1973 | Stanley et al. ......................... | 195/63 |
| 3,737,375 | 6/1973 | Brandl et al. .......................... | 195/63 |
| 3,764,477 | 10/1973 | Lehmann et al....................... | 195/63 |
| 3,796,634 | 3/1972 | Haynes et al. ......................... | 195/63 |

Primary Examiner—David M. Naff

[57] ABSTRACT

Water-insoluble enzyme preparations are formed from a penicillin acylase enzyme; a water-insoluble absorbent material, preferably a cross-linked acrylate polymer containing free carboxyl groups; a water-soluble dialdehyde, e.g., glutaraldehyde; and an aliphatic diamine, preferably a α,ω-diaminoalkane having 2 to 10 carbon atoms. The resulting enzyme preparations have improved activity in the production of 6-aminopenicillanic acid.

13 Claims, No Drawings

WATER-INSOLUBLE PENICILLIN ACYLASE

This invention relates to an improved enzyme preparation and particularly to one prepared from acylase enymes known to split the amide bond in penicillins. Such enzymes are herein termed penicillin acylases and they are useful in producing 6-aminopenicillanic acid from penicillins obtained by fermentation processes of naturally-occurring materials, that is using the enzyme under such pH conditions that deacylation (or splitting of the amido group) of the penicillin occurs with the formation of the desired 6-aminopenicillanic acid.

While such penicillin acylase (or deacylase) enzymes have been used for the stated purpose since about 1961, difficulties arise when using the cell-free enzyme because this is not readily separated from the reaction mixture; moreover the cell-free water-soluble enzyme is not easily re-used. It has been proposed to overcome this difficulty by bonding the enzyme to a polymer substrate and thereby rendering it water-soluble. It has also been proposed to prepare a water-insoluble penicillin acylase preparation by absorbing the acylase on a substrate and there cross-linking it by the action of a dialdehyde with or without the formation of links between the polymer substrate and the enzyme.

However, while each of these approaches leads to an insoluble enzyme preparation that can be re-used, there still exists the need to improve the overall yield of 6-aminopenicillanic acid when the enzyme preparation is used in the production thereof, and also to improve the extent to which the particular enzyme preparation may be re-used in successive batch reactions producing 6-amino-penicillanic acid. It is therefore an object of the present invention to provide water-insoluble penicillin acylase enzymes that can be recovered from a reaction medium for re-use, and are a convenient form for storing and transporting the enzyme. It is also an object of the invention to produce by the use of such enzyme preparation a high yield of 6-aminopenicillanic acid in a high state of purity.

We have found that these objects can be achieved by associating the penicillin acylase with a water-insoluble absorbant substrate and treating it with both a water-soluble dialdehyde and an aliphatic diamine. By the use of the aliphatic diamine improved results are obtained over the prior art process when such diamine was not used in the preparation of the water-soluble enzyme preparation. In particular the said enzyme preparation has an improved stability which enables it to be re-used in a greater number of successive conversion of batches of a penicillin to 6-aminopenicillanic acid than when the diamine is not so employed.

Accordingly, from one aspect, the present invention provides a water-insoluble enzyme preparation comprising a penicillin acylase enzyme associated with a water-insoluble absorbant material by the action of a water-soluble dialdehyde and an aliphatic diamine.

Preferably the acylase enzyme is obtained from bacteria such as strains of *Escherichia coli*, when used from the splitting of benzylpenicillin into 6-aminopenicillanic acid; or for example, from fungi and actinomycetes when used for the splitting of phenoxymethylpenicillin.

Preferably the water-soluble dialdehyde is glyoxal or more preferably glutaraldehyde.

Suitable absorbent materials include cellulose powder and various cellulose derivatives, ion exchange resins, silica gel and other polymeric materials. Particularly suitable are cross-linked polyacrylate or polymethacrylate resins, preferably when these are in macroreticular form, that is a form with a large ratio of surface area to weight.

The water-insoluble absorbent material is preferably a finely-divided polymeric material so that there is sufficient surface area to give water-insoluble enzyme preparations of high specific activity. Thus the surface area available for absorption of the enzyme increases as the particle size of the absorbent material decreases. In the case of the cross-linked poly(meth)acrylates, the resin particles may conveniently range up to an average particle size of 0.6mm (at which size the surface area is 450 square metres/g resin). As the particle size is reduced the efficiency of the coupling reaction as well as the specific activity of the final water insoluble enzyme preparation increases.

Preferably the aliphatic diamine is a straight-chain $\alpha$-$\omega$-aliphatic diamine having 2 to 10 carbon atoms, especially 1,3-diaminopropane or 1,6-diaminohexane.

From a second aspect the invention also provides a process for the preparation of a water-insoluble enzyme preparation of the invention, which process comprises contacting in aqueous solution a water-insoluble absorbent material with a penicillin acylase, a water-soluble dialdehyde and with an aliphatic diamine.

Preferably the enzyme preparation is prepared in aqueous solution at pH 5 – 9.

The order with which the four components of the enzyme preparations of the invention are mixed is often of importance in producing a preparation with optimum properties. In one useful method of preparation, the water-insoluble absorbent material is first contacted with the acylase enzyme optionally in the presence of the diamine and then consecutively or concurrently with the dialdehyde, and aliphatic diamine if not previously added. In such methods the enzyme is preferably absorbed in the presence of from 0.1 to 5.0, preferably from 0.2 to 2.0, millimoles of the diamine per gram of absorbent material and from 0.25 to 10.0, preferably 2.5 to 5.0, millimoles of the dialdehyde per gram of absorbent material.

In order to ensure that any excess aldehyde groups are reacted after completion of the coupling reaction, the enzyme resin is usefully washed with either solutions of sodium metabisulphite, aliphatic diamine, urea or glycine.

Using the above conditions, the water-insoluble enzyme preparations can be sufficiently stable to enable at least 25 successive splittings of penicillin in a batch reactor to be carried out without an appreciable decline in the efficiency of the reaction.

The effect of the pH at which the coupling is carried out is also found to influence the stability of the water-insoluble enzyme preparations. A useful method for quickly determining the enzyme resin stability is to incubate the water-insoluble enzyme preparations moistened with buffer solution (pH 7.8) at 37°C. In the absence of any stabilising effect due to substrate or products, the loss of enzyme activity is greatly accelerated.

An alternative coupling procedure which results in water-insoluble enzyme preparations of even greater stability is the pretreatment of the absorbent material with a mixture of the diamine and dialdehyde followed by absorption of the acylase enzyme. Important parameters in this preferred procedure are the quantities and molar ratios of aliphatic diamine and dialdehyde. The diamine and dialdehyde should be present in concentrations ranging from 0.01 to 20.0, preferably from 0.1 to 10.0, millimoles per gram of absorbent material, and the molar ratio of diamine to dialdehyde should be between 1:0.1 to 1:40, preferably between 1:1 to 1:10. The pH at which pretreatment of the resin is carried out is preferably between 4 and 9. Under optimal conditions, the stability of the resulting enzyme preparation can be sufficient to enable 50 or more successive splittings of penicillin.

It has further been found that the retention of enzyme activity after absorption on the substrate is often improved, particularly when the substrate is a cross-linked poly(meth)acrylate resin, if the enzyme is pretreated with a mono or dialdehyde such as formaldehyde or glutaraldehyde in concentrations ranging from 0.5 to 5 percent at pH values from 5 to 8 for 2 to 24 hours in the case of formaldehyde and from 0.01 to 0.5 percent at pH values from 5 to 8 for 2 to 24 hours in the case of glutaraldehyde. Such treatment can take place before or after isolation of the enzyme from its natural source, e.g., the whole E.Coli cells.

Both the efficiency of the coupling reaction and the specific activity of the final water-insoluble enzyme preparation improve as the purity of the enzyme used in the coupling reaction increases. The enzyme purity may range from 0.15 micromoles/min/mg protein to 50 micromoles/min/mg protein and is conveniently in the range of 1.5 micromoles/min/mg protein to 15 micromoles/min/mg protein.

When the absorbent material is first contacted with the enzyme or enzyme plus diamine or diamine plus dialdehyde in aqueous solution, a residence time of 2 to 24 hours is desirable for good absorption. When the product is contacted with the dialdehyde followed by diamine or with dialdehyde and diamine simultaneously, or with enzyme solution, a residence time of from 2 to 24 hours is also desirable for good absorption. The temperature for these coupling reactions may range from 1° to 37°C, preferably from 15° to 25°C.

The present invention provides, from a third aspect, a process for the production of 6-aminopenicillanic acid which comprises treating benzylpenicillin or phenoxymethylpenicillin with a water-insoluble enzyme preparation according to the first aspect of the invention in an aqueous medium of pH of from 6.0 to 9.0, preferably from 7.0 to 8.5.

During the above-mentioned process, the pH of the moisture mixture must be maintained by the periodic or continuous addition of alkali due to the side-chain acid that is liberated from the penicillin in the deacylation process. This process is therefore most conveniently operated as a batch reaction in a stirred tank. The use of a column reactor containing the enzyme preparation is however possible if the reaction medium is circulated rapidly to minimise the fall in pH value and the pH is re-adjusted in a stirred reactor placed in series with the column.

The enzyme preparations of the invention possess not only the advantage of re-usability, but also they may be recovered at the end of a series of successive penicillin splittings, the residual protein removed by acid treatment, and then fresh enzyme re-coupled to this resin by the above described procedures and the enzyme resin used for a further series of penicillin splittings.

The invention is illustrated by the following Examples wherein Examples 1 to 12 illustrate the preparation of the enzyme preparation by contacting the enzyme with the substrate before addition of the dialdehyde, while Examples 13, 14 and 16–21 illustrate such preparation when the substrate is pretreated with the dialdehyde and diamine before the enzyme is contacted therewith. In Example 15 all constituents were mixed substantially simultaneously.

In the Examples the Amberlite XAD-7 resin is a commercially available cross-linked methacrylate polymer in macroretitular form; and the activity given for each enzyme preparation is in micromoles (herein designated $\mu M$) of 6-aminopenicillanic acid produced at pH 7.8 and 37 percent per minute per gram of preparation.

For use in the Examples a partially purified preparation of acylase enzyme was prepared by releasing the enzyme from the cells of an acylase-producing strain of Esherichia coli NCIB 8743 by mechanical means in a homogeniser. Cell debris was removed by filtration after adjustment to pH 5.0. The enzyme was precipitated by conventional techniques such as precipitation with ammonium sulphate, for example to 75 percent saturation, harvesting the precipitate, redissolving it in water and then dialysing the solution, which was either used directly for coupling to the water-insoluble absorbent materials or was freeze-dried and then redissolved as required. Enzyme of greater purity for coupling was obtained by further purification of the enzyme solution obtained as described above by using conventional methods for protein purification, for example, ion exchange chromatorgraphy or heat treatment.

EXAMPLES 1 – 7

An amount of a diamine as stated below was dissolved in 1500 ml of 0.5M citrate phosphate buffer at pH 5.0. The pH was adjusted to 5.0 and the stated amount of penicillin acylase was added. 100 g of Amberlite XAD-7 resin was then added and the whole was stirred slowly for 18 hours at room temperature. 100 ml of 50 percent aqueous glutaraldehyde was then added and the pH was adjusted to 5.0. After 18 hours further agitation, the solid was recovered by filtration and washed with water, 5 percent sodium metabisulphite, 1M sodium chloride and 0.5M phosphate buffer at pH 7.8. The activity of the preparation was as stated below.

An amount (as stated below) of some of the preparations made as described above was used to carry out a number of successive deacylations of potassium benzylpenicillin (6 percent) in a 1 litre stirred reactor at pH 7.8 and 37°C. In each of the experiments the conversion yield is stated after 5 hours.

| Example | Diamine of formula $H_2N(CH_2)_n NH_2$ | | Acylase amount | Activity of preparation ($\mu M/min./g.$) | Use for deacylation | | |
|---------|---|---|---|---|---|---|---|
| | n | amount | | | Amount | No. of successive deacylations | Conversion (%) |
| 1 | 6 | 15 g | 5g | 16 | 200 g | 15 | 90 |

—Continued

| Example | Diamine of formula $H_2N(CH_2)_n NH_2$ | | Acylase amount | Activity of preparation ($\mu M/min./g.$) | Use for deacylation | | |
|---|---|---|---|---|---|---|---|
| | n | amount | | | Amount | No. of successive deacylations | Conversion (%) |
| 2 | 3 | 11 ml | 5g | 24 | 100 g | 25 | 90 |
| 3 | 2 | 10.2 ml | 100ml | 17.2 | 100 g | 10 | 85 |
| 4 | 4 | 14 g | 100ml | 40 | — | — | — |
| 5 | 5 | 13 g | 150ml | 10 | — | — | — |
| 6 | 8 | 18.7 g | 100ml | 12.8 | — | — | — |
| 7 | 10 | 22.2 g | 100ml | 15.2 | — | — | — |

EXAMPLE 8

Example 1 was repeated using only 300 ml. of the buffer solution and 50 ml. of the amidase enzyme in 250 ml. of water and with stirring together the enzyme and resin for 18 hours before addition of 200 ml. of 25 percent aqueous glutoraldehyde was added. The activity of the resulting preparation was 20.6 $\mu M/min./g$.

When 103 g. of this material was used to deacylate benzylpenicillin as described in Example 1, 91 percent of the penicillin was converted to 6-aminopenicillanic acid in 5 hours after 18 successive re-uses of the material.

EXAMPLES 9 – 10

An amount of 1,3-diaminopropane as stated was dissolved in 1500 ml of 0.25 M phosphate buffer at pH 7.0. 25 ml of penicillin acylase solution and 100 g of Amberlite XAD-7 resin were added after the pH of the diamine solution had been adjusted to 7.0. After gentle agitation for 18 hours 200 ml of 25 percent glutaraldehyde was added, the pH adjusted to 7.0 and agitation was carried on for a further 18 hours. The material was then filtered and washed as described in Example 1 to produce a preparation with stated activity. When this material was used to deacylate 1 litre of 6 percent potassium benzylpenicillin at pH 7.8 and 37°C the conversion of penicillin stated below was achieved after 5 hours in 10 successive experiments.

| Diamine Amount (ml.) | Activity of Preparation ($\mu M/min./g.$) | Use for deacylation | |
|---|---|---|---|
| | | Amount (g) | Conversion (%) |
| 2 | 17.4 | 110 | 75 |
| 5 | 17.2 | 106 | 90 |

EXAMPLE 11

60 ml of penicillin acylase solution was added to 300 ml of 0.5M phosphate buffer (pH 7.0); 240 ml of distilled water was then added together with 100 g. of Amberlite XAD-7 resin. The enzyme was allowed to absorb onto the resin during 18 hours gentle agitation. 11 ml of 1,3-diaminopropane and 200 ml of 25 percent aqueous glutaraldehyde were then added in such a manner that the pH was not allowed to rise above 8.0. The solution was finally adjusted to pH 7.0 and stirred for 18 hours. The solid was harvested and washed as described in Example 1. 107 g. of insoluble enzyme were obtained and the activity determined by using potassium benzylpenicillin was found to be 11.92 $\mu M/min/g$.

EXAMPLE 12

To 500 ml of a solution of penicillin acylase prepared in 0.2M phosphate buffer at pH 7.0 was added 100 g. of Amberlite XAD-7 resin. The whole was stirred for 16 hours. The solid was recovered by filtration and was added to 500 ml. of a 5 percent solution of glutaraldehyde in 0.1M phosphate buffer at pH 7.0 and stirred for 16 hours. The solid was again recovered by filtration and was added to 500 ml of 0.2 percent 1,3-diaminopropane in 0.1M phosphate buffer at pH 7.0 and stirred for 16 hours. The solid was recovered and washed with 5 percent aqueous sodium chloride, 2.5 percent metabisulphite and 0.2M phosphate buffer at pH 7.0. The activity of the preparation was 30.8 $\mu M/min/g$.

EXAMPLE 13

100 g. of Amberlite XAD-7 resin was added to 600 ml of distilled water to which was added 200 ml of 25 percent aqueous glutaraldehyde. The pH was adjusted to 7.0 and the whole was stirred for 2 hours. 2 ml of 1,3-diaminopropane was added and allowed to react with gentle agitation for 18 hours. The solid was filtered off, washed with water and resuspended in 575 ml of 0.2M phosphate buffer pH 7.0. 25 ml of penicillin acylase solution was added and allowed to bind for 18 hours with gentle agitation. The solid was washed with 1M sodium chloride and 0.2M phosphate buffer pH 7.8. The activity of the preparation was 42 $\mu M/min/g$.

120 g. of such a preparation was used to deacylate 1 litre of 8 percent potassium benzylpenicillin at pH 7.8 and 37°C. In 6 successive experiments over 80 percent of the substrate was converted in 5 hours.

EXAMPLE 14

100 g. of Amberlite XAD-7 resin was dded to 500 ml of a 5 percent v/v aqueous solution of glutaraldehyde at pH 7.0 and gently stirred for 2 hours. Diaminopropane (1 ml) was then added and the pH readjusted to 7.0 with hydrochloric acid; gentle agitation was continued for a further 14 hours. The treated resin was filtered off, washed with water and filtered off again and then added to a solution of penicillin acylase in 0.2M phosphate buffer at pH 7.0 and gently stirred for 16 hours. The resin with the enzyme attached was collected by filtration and transferred to 500 ml water containing 1 ml diaminopropane (pH 7.0) and gently stirred for a further 8 hours. After collection by filtration, the enzyme/resin was washed successively with 1M NaCl, 2.5 percent w/v aqueous sodium metabisulphite and twice with 0.2M phosphate buffer at pH 7.0. The activity of the preparation was 35 $\mu M/min/g$.

100 g. of the above preparation was used to deacylate 1 litre of potassium benzylpenicillin (7 percent w/v) at pH 7.8 and 37°C for 5 hours. In 25 successive experiments, the conversion of substrate was greater than 90 percent.

EXAMPLE 15

To diaminopropane (1 ml) and 25 percent v/v glutaraldehyde (4 mls) in 0.2M phosphate buffer at the pH values indicated in the table below was added enzyme solution (77 μM/min/g resin) and 20 g of cross-linked polymethacrylate resin, (Amberlite XAD-7). The final volume was adjusted to 100 ml. After stirring at room temperature for 16 hours, the resin was filtered off and washed thoroughly in phosphate buffer pH 7.8. The specific activity of the resin was determined immediately aftewards and again after storage of the damp resin at 37°C for 1, 4 and 5 days. Results are tabulated below.

| pH of coupling reaction | specific activity of enzyme resin (μM/min/g) | Cumulative percentage loss of activity after storage at 37°C | | |
|---|---|---|---|---|
| | | 1 day | 4 days | 5 days |
| 4.5 | 38 | 22 | 40 | 40 |
| 5.5 | 41.5 | 19 | 33 | 33 |
| 6.5 | 38 | 12 | 31 | 31 |
| 7.5 | 39 | 11 | 26 | 26 |
| 8.5 | 35 | 7 | 23 | 23 |

EXAMPLE 16

To 0.2M phosphate solution was added 16 ml. of 25 percent glutaraldehyde solution plus 1 ml of diaminopropane and the pH adjusted to the values tabulated below. The final volume was adjusted to 100 ml and then 25 g. of Amberlite XAD-7 resin was added and the whole stirred at 25°C for 16 hours, filtered and washed in buffer, pH 6.0. The resin was then added to enzyme solution in 0.2M phosphate buffer pH 6.0, stirred 16 hours at 25°C, filtered and washed with 0.2M pH 7.8 buffer prior to assay. Further assays were carried out after storage in a damp state (pH 7.8 buffer) at 37°C after 1, 4 and 8 days.

| pH of 1,3-diamino-propane and glutar-aldehyde pretreatment | Activity of XAD (μM/min/gm) | Cumulative % loss of Activity after storage 37°C | | |
|---|---|---|---|---|
| | | 1 day | 4 days | 8 days |
| 5.0 | 37 | 0 | 7 | 7 |
| 7.0 | 26 | 1 | 1 | — |
| 9.0 | 12 | 0 | 14 | — |

EXAMPLE 17

To 0.2M phosphate solution was added the percentages of 25 percent aqueous glutaraldehyde and diaminopropane tabulated below. The final pH was adjusted to 6.0 and the volume to 100 ml. 25 g. of Amberlite XAD-7 resin were added and the whole stirred at 25°C for 16 hours. The resin was filtered and washed in 0.2M pH 6.0 buffer. The resin was then added to the acylase solution in 0.2M phosphate pH 6.0 stirred 16 hours at 25°C, filtered and washed in 0.2M pH 7.8 buffer. The resin was assayed prior to storage at 37°C in a damp state and again after 8 days.

| % (v/v) of diaminopropane | % (v/v) of Glutaraldehyde | Activity/gm μM/min/gm | Activity after storage 8 days |
|---|---|---|---|
| 1 | 4 | 40 | 34 |
| 4 | 4 | 41 | 29 |
| 8 | 4 | 46 | 29 |
| 10 | 4 | 41 | 26 |

EXAMPLE 18

To 200 ml of 0.2M phosphate buffer at pH 6.0 was added 48 ml of 25 percent aqueous glutaraldehyde and 3 ml of 1,3-diaminopropane. The pH was readjusted to 6.0 and the volume made up to 300 ml with phosphate buffer. Amberlite XAD-7 (100 g) resin was added and the whole stirred for 16 hours at pH 6.0 and 25°C. The resin was filtered and washed in buffer. Enzyme solution was made up in pH 6.0 buffer to give the challenging activities tabulated below and then treated with 1 percent formaldehyde for 12 hours at 25°C. The pretreated resin was added to this enzyme solution and, after stirring for 16 hours at pH 6.0, 25°C the enzyme resin was filtered and washed in buffer. The specific activities of the resin and the coupling efficiencies at the different enzyme levels are tabulated below.

| Challenging Activity Units enzyme/g resin | Specific Activity of enzyme resin | Coupling Efficiency |
|---|---|---|
| 77 | 32 | 41.5 % |
| 115 | 35 | 30 % |
| 62 | 28 | 45 % |

EXAMPLE 19

The procedure described in Example 18 was repeated using enzyme of different purity. In all cases the challenging activity was 77 μM/min/g resin. The specific activities and coupling efficiencies obtained are tabulated below.

| Specific Activity of enzyme used for coupling (μM/min/mg protein) | Specific Activity of enzyme resin (μM/min/g) | Coupling Efficiency |
|---|---|---|
| 3.8 | 31 | 40 % |
| 6.1 | 40 | 52 % |
| 13.8 | 59 | 77 % |

EXAMPLE 20

The procedure described in Example 18 was repeated except that Amberlite XAD-7 of smaller particle size, i.e., of between 200 and 400 mesh (cf 30 mesh in Example 18) was challenged with two different enzyme concentrations.

| Challenging Activity (μM/min/g resin) | Specific Activity Of enzyme resin (μM/min/g) | Coupling Efficiency |
|---|---|---|
| 115 | 99 | 86 % |
| 154 | 135 | 88 % |

EXAMPLE 21

The procedure described in Example 18 was repeated using 5 kg of Amberlite XAD-7, other ingredients being increased proportionately. The resulting enzyme preparation, which had an activity of 31 micromoles/min/g., was used to split 40 litres of benzyl penicillin solution of concentration 6.5 percent w/v.

The average efficiency of conversion to 6-aminopenicillanic acid after 6 hours' reaction of 50 successive reuses of this preparation was 95 percent.

We claim:

1. A process for the preparation of a water-insoluble enzyme preparation which comprises contacting in aqueous solution a water-insoluble absorbent material with a penicillin acylase enzyme, 0.1 to 10.0 millimoles of a water-soluble dialdehyde per gram of absorbent material and 0.1 to 5.0 millimoles of an aliphatic diamine per gram of absorbent material, the molar ratio of diamine to dialdehyde being from 1:1 to 1:10.

2. A process according to claim 1, wherein the penicillin acylase enzyme is first contacted with a cross-linked acrylate or methacrylate resin as the water-insoluble absorbent material, before glutaraldehyde is added as the water-soluble dialdehyde.

3. A process according to claim 2, wherein the diamine is an $\alpha,\omega$-diaminoalkane having 2 to 10 carbon atoms and is present when the enzyme is contacted with the polymer.

4. A process according to claim 1, wherein a cross-linked acrylate polymer containing free carboxyl groups as the water-insoluble absorbent material is pretreated with an $\alpha,\omega$-diaminoalkane having 2 to 10 carbon atoms and with glutaraldehyde as the water-soluble dialdehyde before contact of the polymer with the penicillin acylase enzyme.

5. A process according to claim 1 wherein the diamine is 1,3-diaminopropane or 1,6-diaminohexane.

6. A process according to claim 1 wherein the dialdehyde is glyoxal or glutaraldehyde.

7. A process according to claim 1 wherein the dialdehyde is glyoxal or glutaraldehyde and the diamine is 1,3-diaminopropane or 1,5-diaminohexane.

8. A process according to claim 1 wherein the penicillin acylase enzyme is obtained from E. coli, fungi or actinomycetes.

9. A process according to claim 1 wherein 0.2 to 2.0 millimoles of diamine are used per gram of absorbent material and 2.5 to 5.0 millimoles of dialdehyde are used per gram of absorbent material.

10. A water-insoluble enzyme preparation prepared by the process of claim 1.

11. A water-insoluble enzyme preparation according to claim 10 wherein the dialdehyde is glyoxal or glutaraldehyde and the diamine is 1,3-diaminopropane or 1,6-diaminohexane.

12. A water-insoluble enzyme preparation according to claim 10 wherein the water-insoluble absorbent material is a cross-linked acrylate or methacrylate resin, the dialdehyde is glutaraldehyde and the diamine is an $\alpha,\omega$-diaminoalkane having 2 to 10 carbon atoms.

13. A water-insoluble enzyme preparation according to claim 12 wherein the $\alpha,\omega$-diaminoalkane is 1,3-diaminopropane or 1,6-diaminohexane.

* * * * *